(12) United States Patent
Throndson et al.

(10) Patent No.: US 8,911,673 B2
(45) Date of Patent: Dec. 16, 2014

(54) PROCESS AND APPARATUS FOR DISTRIBUTING HYDROCARBON FEED TO A CATALYST STREAM

(75) Inventors: Roger L. Throndson, Schaumburg, IL (US); Paolo Palmas, Des Plaines, IL (US); Lev Davydov, Northbrook, IL (US); Mohammad-Reza Mostofi-Ashtiani, Naperville, IL (US)

(73) Assignee: UOP LLC, Des Plaines, IL (US)

( * ) Notice: Subject to any disclaimer, the term of this patent is extended or adjusted under 35 U.S.C. 154(b) by 273 days.

(21) Appl. No.: 13/534,292

(22) Filed: Jun. 27, 2012

(65) Prior Publication Data

US 2014/0004018 A1  Jan. 2, 2014

(51) Int. Cl.
*B01J 8/08* (2006.01)

(52) U.S. Cl.
USPC ............................ 422/145; 422/139; 422/214

(58) Field of Classification Search
USPC .................................................. 422/139, 214
See application file for complete search history.

(56) References Cited

U.S. PATENT DOCUMENTS

| | | | |
|---|---|---|---|
| 5,017,343 A * | 5/1991 | Cetinkaya | 422/140 |
| 6,098,896 A | 8/2000 | Haruch | |
| 6,797,239 B1 | 9/2004 | Chen et al. | |
| 7,758,817 B2 | 7/2010 | Hedrick et al. | |
| 2005/0074371 A1 | 4/2005 | Lomas et al. | |
| 2007/0205139 A1 | 9/2007 | Kulprathipanja et al. | |
| 2008/0081006 A1 | 4/2008 | Myers et al. | |
| 2010/0104482 A1 | 4/2010 | Morin et al. | |
| 2010/0152515 A1 * | 6/2010 | Palmas et al. | 585/653 |
| 2011/0056871 A1 * | 3/2011 | Couch et al. | 208/113 |
| 2011/0112344 A1 | 5/2011 | Chewter et al. | |
| 2011/0112345 A1 | 5/2011 | Chewter et al. | |
| 2011/0282124 A1 | 11/2011 | Palmas et al. | |
| 2014/0001096 A1 | 1/2014 | Throndson et al. | |

FOREIGN PATENT DOCUMENTS

| | | |
|---|---|---|
| CA | 1252059 A1 | 4/1989 |
| GB | 721958 A | 1/1955 |
| RU | 2410155 C2 | 1/2011 |
| RU | 2449003 C2 | 4/2012 |

OTHER PUBLICATIONS

Johnston, "Effect of Distributor Designs on the Flow Development in Downer Reactor", AIChE Journal (ISSN 0001-1541) V45 N.7 1587-92 (Jul. 1999), v 45, n 7, p. 1587-92, Jul. 1999; ISSN: 00011541; Publisher: John Wiley and Sons.
Kono, "The Staged Undertow Fluidized Bed", AIChE Symposium Series V79 N.222 37-46 (1983) In English, v 79, n 222, p. 37-46, 1983; ISSN: 00658812; Publisher: American Institute of Chemical Engineers (AIChE).
Kunesh, "Direct-Contact Heat Transfer from a Liquid Spray into a Condensing Vapor", Ind. Eng. Chem. Res. 1993, 32, 2887-2389.

* cited by examiner

*Primary Examiner* — Lessanework Seifu
(74) *Attorney, Agent, or Firm* — James C Paschall

(57) ABSTRACT

A process and apparatus described is for distributing hydrocarbon feed to catalyst in a riser. Hydrocarbon feed is delivered to a plenum in the riser. Nozzles from the plenum inject feed into the riser to contact the catalyst. Streams of regenerated catalyst and carbonized catalyst may be passed to the riser and mixed around an insert in a lower section of a riser. The plenum may be located in the riser.

17 Claims, 5 Drawing Sheets

PROCESS AND APPARATUS FOR DISTRIBUTING HYDROCARBON FEED TO A CATALYST STREAM

BACKGROUND OF THE INVENTION

The invention relates to a process and apparatus for distributing hydrocarbon feed to be contacted with catalyst. A field of the invention may be the field of fluid catalytic cracking (FCC).

FCC is a hydrocarbon conversion process accomplished by contacting hydrocarbons in a fluidized reaction zone with a catalyst composed of finely divided particulate material. The reaction in catalytic cracking, as opposed to hydrocracking, is carried out in the absence of substantial added hydrogen or the consumption of hydrogen. As the cracking reaction proceeds substantial amounts of highly carbonaceous material referred to as coke are deposited on the catalyst to provide coked or carbonized catalyst. This carbonized catalyst is often referred to as spent catalyst. However, this term may be misconstrued because the carbonized catalyst still has significant catalytic activity. Vaporous products are separated from carbonized catalyst in a reactor vessel. Carbonized catalyst may be subjected to stripping over an inert gas such as steam to strip entrained hydrocarbonaceous gases from the carbonized catalyst. A high temperature regeneration with oxygen within a regeneration zone operation burns coke from the carbonized catalyst which may have been stripped.

Although the carbonized catalyst carries coke deposits it may still have activity. U.S. Pat. No. 3,888,762 discloses mixing carbonized and regenerated catalyst for contact with the hydrocarbon feed. The regenerated catalyst may be in the range of 593° to 760° C. (1100° to 1400° F.) and the carbonized catalyst may be in the range of 482° to 621° C. (900° to 1150° F.). U.S. Pat. No. 5,597,537 discloses mixing the carbonized and regenerated catalyst in a blending vessel to allow the regenerated and carbonized catalyst to reach a temperature equilibrium before contacting the hydrocarbon feed. U.S. Pat. No. 7,935,314 B2 discloses baffles in the riser to obstruct upward catalyst flow to foster mixing. A mixed catalyst with more uniform temperature avoids undesirable hot spots that can generate nonselective cracking to reduce the value of the product hydrocarbons.

FCC can create a variety of products from heavier hydrocarbons. Often, a feed of heavier hydrocarbons, such as a vacuum gas oil, is provided to an FCC reactor. Various products may be produced, including a gasoline product and/or light olefins, such as at least one of propylene and ethylene. To produce more light olefins, product cuts from FCC effluent, such as naphtha, may be recycled to the riser reactor or to an additional riser reactor for additional catalytic cracking. These product cuts may be fed to the riser in a gaseous phase.

Current known methods of distributing a vapor stream to a riser are pose technical challenges. Typically, distribution would be accomplished by using a conventional feed distributor but due to the feed stream being in the vapor phase this would require a significant number of distributors to achieve sufficient mass distribution to the riser. Other known means of distributing the vapor stream, such as open pipes or pipes with slots at the end, are inefficient at evenly distributing the recycle stream in the riser.

It may be desirable to provide a distributor for distributing hydrocarbon feed to an FCC reactor.

It may be desirable to provide a distributor for distributing gaseous hydrocarbon feed to an FCC reactor.

It may also be desirable to provide a distributor for distributing hydrocarbon feed to an FCC reactor that assists with mixing of separate streams of catalyst.

SUMMARY OF THE INVENTION

This invention relates generally to an improved FCC process and apparatus. Specifically, this invention may relate to an improved feed distributor and may be useful for FCC operation to spray vaporized feed into a reactor riser.

In a process embodiment, the present invention is a fluid catalytic process comprising feeding a stream of catalyst to a riser. A vaporous hydrocarbon feed stream is fed to a plenum in the riser. The hydrocarbon feed stream from the plenum is injected away from a radial center of the riser into the riser. Lastly, the hydrocarbon feed stream and the stream of catalyst are passed up the riser.

In an additional process embodiment, the present invention is a fluid catalytic process comprising feeding a first stream of catalyst and a second stream of catalyst to a riser. A hydrocarbon feed stream is fed to a plenum in the riser. The hydrocarbon feed is injected from the plenum into the riser. The hydrocarbon feed stream is contacted with the first stream of catalyst and the second stream of catalyst. Lastly, the hydrocarbon feed stream, the first stream of catalyst and the second stream of catalyst are passed up the riser.

In a further process embodiment, the present invention is a process for distributing feed to a riser comprising feeding a first stream of catalyst and a second stream of catalyst to the riser. A hydrocarbon feed stream is fed to a plenum in the riser. The first stream of catalyst is passed around an insert comprising the plenum to mix with the second stream of catalyst and the second stream of catalyst is passed around the insert to mix with the first stream of catalyst to provide a mixed stream of catalyst. The hydrocarbon feed stream is injected from the plenum into the riser. The hydrocarbon feed stream is contacted with the mixed stream of catalyst and the hydrocarbon feed stream and the mixed stream of catalyst are passed up the riser.

In an apparatus embodiment, the present invention is an apparatus for fluid catalysis comprising a riser. A plenum is located in a radial center of the riser. Lastly, a nozzle in the plenum has an outlet end directed away from the radial center for injecting hydrocarbon feed.

In an additional apparatus embodiment, the present invention is an apparatus for fluid catalysis comprising a riser. An insert in the riser defines a space between a wall of the riser and a wall of the insert. A nozzle in the insert is for injecting hydrocarbon feed. A first catalyst inlet is in communication with the riser and a second catalyst inlet is in communication with the riser. The insert in the riser is between the first catalyst inlet and the second catalyst inlet.

In a further apparatus embodiment, the present invention is an apparatus for fluid catalysis comprising a riser. An insert in the riser defines a space between a wall of the riser and a wall of the insert. A nozzle in the insert is for injecting hydrocarbon feed. A first catalyst inlet is in communication with the riser, and a second catalyst inlet is in communication with the riser. The insert in the riser is between the first catalyst inlet and the second catalyst inlet, and the nozzle is disposed at a higher elevation than the first catalyst inlet and the second catalyst inlet.

The feed distributor evenly distributes the hydrocarbon stream which may be a vapor stream to the riser. The feed stream may be distributed utilizing numerous nozzles located in a lower section of the riser. A dual diameter nozzle may provide a means to independently set the jet outlet velocity and the distributor pressure drop. The distributor may also assist the thorough mixing of streams of catalyst at different temperatures to have a more homogeneous temperature.

DEFINITIONS

The term "communication" means that material flow is operatively permitted between enumerated components.

The term "downstream communication" means that at least a portion of material flowing to the subject in downstream communication may operatively flow from the object with which it communicates.

The term "upstream communication" means that at least a portion of the material flowing from the subject in upstream communication may operatively flow to the object with which it communicates.

The term "direct communication" means that flow from the upstream component enters the downstream component without passing through an intermediate vessel.

The term "feeding" means that the feed passes from a conduit or vessel directly to an object without passing through an intermediate vessel.

The term "passing" includes "feeding" and means that the material passes from a conduit or vessel to an object.

DETAILED DESCRIPTION OF THE INVENTION

The apparatus and process of the present invention is a distributor for distributing a hydrocarbon feed to a riser to be contacted with catalyst. In an aspect, the hydrocarbon feed is in vapor phase. The distributor may distribute the only hydrocarbon feed to the riser or an additional feed to the riser. If the distributor distributes additional feed, the feed may be a recycled feed derived from riser effluent. Accordingly, the hydrocarbon feed may be a conventional FCC feed or a light hydrocarbon stream. The distributor may distribute feed to a lower end of a riser in which regenerated catalyst and carbonized catalyst are mixed for contact with the hydrocarbon feed. The present invention may be useful in any solids-gas contacting equipment. However, ready usefulness is found in an FCC unit.

Figure 1:
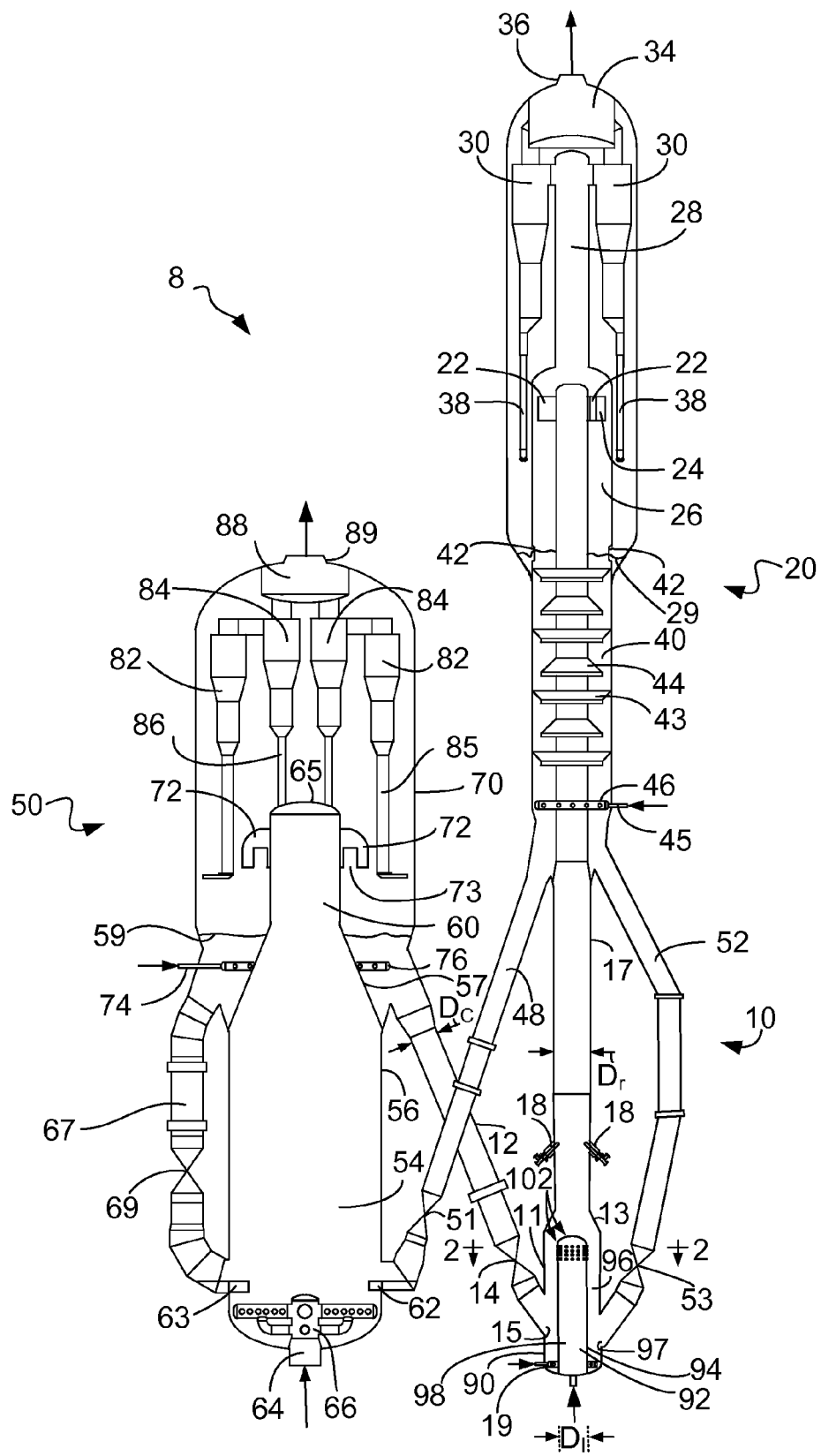
FIG. 1 is a schematic, elevational view of an FCC unit incorporating the present invention.

FIG. 1 shows an FCC unit 8 that includes a reactor vessel 20 and a regenerator vessel 50. A first regenerated catalyst conduit 12 transfers a first regenerated catalyst stream from the regenerator vessel 50 at a rate regulated by a control valve 14 through a regenerated catalyst inlet 15 of the first regenerated catalyst conduit 12 to the reactor riser 10. The first regenerated catalyst inlet 15 is in upstream communication with the riser 10. An optional second carbonized catalyst conduit 52 transfers a second carbonized catalyst stream from the reactor vessel 20 at a rate regulated by a control valve 53 through a carbonized catalyst inlet 97 of the second carbonized catalyst conduit 52 to the reactor riser 10. The optional second carbonized catalyst inlet 97 is in upstream communication with the riser 10.

The riser 10 is an elongated vertical tube typically made of killed carbon steel. The riser 10 may comprise a lower section 11 and an upper section 17. The upper section 17 may be made of chrome steel. The lower section 11 may include a hemispherical bottom. The lower section 11 may have a larger inner diameter than the upper section 17 of the riser. The enlarged lower section 11 may include a frustoconical or curved transition section 13 that tapers between the enlarged diameter of the enlarged lower section and the narrowed diameter of a narrowed upper section 17 of the riser. If the hydrocarbon feed to the lower end 11 of the riser 10 is vaporous, the transition section 13 is less necessary or may be omitted. The first regenerated catalyst conduit 12 and the second optional carbonized catalyst conduit 52 may connect to the lower section 11 at a wall 90 of the lower section at inlets 15 and 97, respectively. The inner surface of the entire riser 10 may be coated with a refractory material.

A fluidization medium such as steam from a distributor 19 in the lower section 11 urges catalyst upwardly through the riser 10 at a relatively high density. An optional plurality of feed distributors 18 located in the upper section 17 of the riser 10 just above the optional transition section 13 inject a primary hydrocarbon feed across the flowing stream of catalyst particles to distribute hydrocarbon feed to the riser 10. The only hydrocarbon feed or a secondary hydrocarbon feed derived from cracking the primary feed may be fed to the riser 10 in the lower section 11. Upon contacting the hydrocarbon feed with catalyst in the reactor riser 10 the heavier hydrocarbon feed cracks to produce lighter gaseous hydrocarbon product while coke is deposited on the catalyst particles to produce carbonized catalyst.

A conventional FCC feedstock and higher boiling hydrocarbon feedstock are suitable primary hydrocarbon feeds. The most common of such conventional feedstocks is a "vacuum gas oil" (VGO), which is typically a hydrocarbon material having a boiling range of from 343° to 552° C. (650 to 1025° F.) prepared by vacuum fractionation of atmospheric residue. Such a fraction is generally low in coke precursors and heavy metal contamination which can serve to contaminate catalyst. Heavy hydrocarbon feedstocks to which this invention may be applied include heavy bottoms from crude oil, heavy bitumen crude oil, shale oil, tar sand extract, deasphalted residue, products from coal liquefaction, atmospheric and vacuum reduced crudes. Heavy feedstocks for this invention may also include mixtures of the above hydrocarbons and the foregoing list is not comprehensive.

It is also contemplated that lighter recycle or previously cracked feeds such as naphtha may be a suitable secondary or the only hydrocarbon feedstock to the riser. A light naphtha fraction suitable as the only feed or a secondary feed to the riser may have an initial boiling point (IBP) below about 127° C. (260° F.) in the $C_5$ range; i.e., about 35° C. (95° F.), and an end point (EP) at a temperature greater than or equal to about 127° C. (260° F.). The boiling points for these fractions are determined using the procedure known as ASTM D86-82. A heavy naphtha fraction suitable as the only feed or a secondary feed to the riser may have an IBP at or above about 127° C. (260° F.) and an EP at a temperature above about 200° C. (392° F.), preferably between about 204° and about 221° C. (400° and 430° F.). A full range naphtha fraction suitable as the only feed or a secondary feed to the riser may have an initial boiling point (IBP) below about 127° C. (260° F.) in the C$_5$ range; i.e., about 35° C. (95° F.) and an EP at a temperature above about 200° C. (392° F.), preferably between about 204° and about 221° C. (400° and 430° F.).

The reactor vessel 20 is in downstream communication with the riser 10. In the reactor vessel, the carbonized catalyst and the gaseous product are separated. The resulting mixture of gaseous product hydrocarbons and carbonized catalyst continues upwardly through the riser 10 into the reactor vessel 20 in which the carbonized catalyst and gaseous product are separated. A pair of disengaging arms 22 may tangentially and horizontally discharge the mixture of gas and catalyst from a top of the riser 10 through one or more outlet ports 24 (only one is shown) into a disengaging vessel 26 to effect partial separation of gases from the catalyst. Two, three or four disengaging arms 22 may be used depending on the size of the FCC unit 8.

A transport conduit 28 carries the hydrocarbon vapors, including stripped hydrocarbons, stripping media and entrained catalyst to one or more cyclones 30 in the reactor vessel 20 which separates carbonized catalyst from the product hydrocarbon gaseous stream. The disengaging vessel 26 is partially disposed in the reactor vessel 20 and can be considered part of the reactor vessel 20. A collection plenum 34 in the reactor vessel 20 gathers the separated hydrocarbon gaseous streams from the cyclones 30 for passage to an outlet nozzle 36 and eventually into a fractionation recovery zone (not shown). Diplegs 38 discharge catalyst from the cyclones 30 into a lower bed 29 in the reactor vessel 20. The catalyst with adsorbed or entrained hydrocarbons may eventually pass from the lower bed 29 into an optional stripping section 40 across ports 42 defined in a wall of the disengaging vessel 26. Catalyst separated in the disengaging vessel 26 may pass directly into the optional stripping section 40 via the bed 29. A fluidizing conduit 45 delivers inert fluidizing gas, typically steam, to the stripping section 40 through a fluidizing distributor 46.

The stripping section 40 contains baffles 43, 44 or other equipment to promote contacting between a stripping gas and the catalyst. The stripped, carbonized catalyst leaves the stripping section 40 of the disengaging vessel 26 of the reactor vessel 20 with a lower concentration of entrained or adsorbed hydrocarbons than it had when it entered or if it had not been subjected to stripping. A first portion or all of the carbonized catalyst leaves the disengaging vessel 26 of the reactor vessel 20 through a spent catalyst conduit 48 and feeds into the regenerator vessel 50 at a rate regulated by a control valve 51. An optional second portion of the carbonized catalyst that has been coked in the reactor riser 10 leaves the disengaging vessel 26 of the reactor vessel 20 and is fed through the second carbonized catalyst conduit 52 back to the riser 10 at a rate regulated by a control valve 53. The optional second carbonized catalyst conduit 52 is in downstream communication with the reactor vessel 20. The second carbonized catalyst conduit 52 is in downstream communication with the outlet port 24 of the riser 10 and in upstream communication with a carbonized catalyst inlet 97 of the second carbonized catalyst conduit 52 to the riser 10.

The riser 10 of the FCC process is maintained at high temperature conditions which generally include a temperature above about 425° C. (797° F.). In an embodiment, the reaction zone is maintained at cracking conditions which include a temperature of from about 480° to about 621° C. (896° to 1150° F.) at the riser outlet port 24 and a pressure from about 69 to about 517 kPa (ga) (10 to 75 psig) but typically less than about 275 kPa (ga) (40 psig). The catalyst-to-oil ratio, based on the weight of catalyst and feed hydrocarbons entering the bottom of the riser, may range up to 30:1 but is typically between about 4:1 and about 10:1 and may range between 7:1 and 25:1. Hydrogen is not normally added to the riser, although hydrogen addition is known in the art. Steam may be passed into the riser 10 and reactor vessel 20 equivalent to about 2-35 wt-% of feed. Typically, however, the steam rate will be between about 2 and about 7 wt-% for maximum gasoline production and about 10 to about 20 wt-% for maximum light olefin production. The average residence time of catalyst in the riser may be less than about 5 seconds. The type of catalyst employed in the process may be chosen from a variety of commercially available catalysts. A catalyst comprising a zeolitic material such as Y zeolite is preferred, but the older style amorphous catalysts can be used if desired. Additionally, shape-selective additives such as ZSM-5 may be included in the catalyst composition to increase light olefin production.

The regenerator vessel 50 is in downstream communication with the reactor vessel 20. In the regenerator vessel 50, coke is combusted from the portion of carbonized catalyst delivered to the regenerator vessel 50 by contact with an oxygen-containing gas such as air to provide regenerated catalyst. The regenerator vessel 50 may be a combustor type of regenerator, which may use hybrid turbulent bed-fast fluidized conditions in a high-efficiency regenerator vessel 50 for completely regenerating carbonized catalyst. However, other regenerator vessels and other flow conditions may be suitable for the present invention. The spent catalyst conduit 48 feeds carbonized catalyst to a first or lower chamber 54 defined by outer wall 56 through a spent catalyst inlet chute 62. The carbonized catalyst from the reactor vessel 20 usually contains carbon in an amount of from 0.2 to 2 wt-%, which is present in the form of coke. Although coke is primarily composed of carbon, it may contain from 3 to 12 wt-% hydrogen as well as sulfur and other materials. An oxygen-containing combustion gas, typically air, enters the lower chamber 54 of the regenerator vessel 50 through a conduit 64 and is distributed by a distributor 66. As the combustion gas enters the lower chamber 54, it contacts carbonized catalyst entering from chute 62 and lifts the catalyst at a superficial velocity of combustion gas in the lower chamber 54 of perhaps at least 1.1 m/s (3.5 ft/s). In an embodiment, the lower chamber 54 may have a catalyst density of from 48 to 320 kg/m$^3$ (3 to 20 lb/ft$^3$) and a superficial gas velocity of 1.1 to 6.1 m/s (3.5 to 10 ft/s). The oxygen in the combustion gas contacts the carbonized catalyst and combusts carbonaceous deposits from the catalyst to at least partially regenerate the catalyst and generate flue gas.

In an embodiment, to accelerate combustion of the coke in the lower chamber 54, hot regenerated catalyst from a dense catalyst bed 59 in an upper or second chamber 70 may be recirculated into the lower chamber 54 via an external recycle catalyst conduit 67 regulated by a control valve 69. Hot regenerated catalyst enters the lower chamber 54 through an inlet chute 63. Recirculation of regenerated catalyst, by mixing hot catalyst from the dense catalyst bed 59 with relatively cooler carbonized catalyst from the spent catalyst conduit 48 entering the lower chamber 54, raises the overall temperature of the catalyst and gas mixture in the lower chamber 54.

The mixture of catalyst and combustion gas in the lower chamber 54 ascend through a frustoconical transition section 57 to the transport, riser section 60 of the lower chamber 54. The riser section 60 defines a tube which is preferably cylindrical and extends preferably upwardly from the lower chamber 54. The mixture of catalyst and gas travels at a higher superficial gas velocity than in the lower chamber 54. The increased gas velocity is due to the reduced cross-sectional area of the riser section 60 relative to the cross-sectional area of the lower chamber 54 below the transition section 57. Hence, the superficial gas velocity may usually exceed about 2.2 m/s (7 ft/s). The riser section 60 may have a lower catalyst density of less than about 80 kg/m$^3$ (5 lb/ft$^3$).

The regenerator vessel 50 also includes an upper or second chamber 70. The mixture of catalyst particles and flue gas is discharged from an upper portion of the riser section 60 into the upper chamber 70. Substantially completely regenerated catalyst may exit the top of the transport, riser section 60, but arrangements in which partially regenerated catalyst exits from the lower chamber 54 are also contemplated. Discharge is effected through a disengaging device 72 that separates a majority of the regenerated catalyst from the flue gas. In an embodiment, catalyst and gas flowing up the riser section 60 impact a top elliptical cap 65 of the riser section 60 and reverse flow. The catalyst and gas then exit through downwardly directed discharge outlets 73 of disengaging device 72. The sudden loss of momentum and downward flow reversal cause a majority of the heavier catalyst to fall to the dense catalyst bed 59 and the lighter flue gas and a minor portion of the catalyst still entrained therein to ascend upwardly in the upper chamber 70. Cyclones 82, 84 further separate catalyst from ascending gas and deposits catalyst through dip legs 85, 86 into dense catalyst bed 59. Flue gas exits the cyclones 82, 84 and collects in a plenum 88 for passage to an outlet nozzle 89 of regenerator vessel 50 and perhaps into a flue gas or power recovery system (not shown). Catalyst densities in the dense catalyst bed 59 are typically kept within a range of from about 640 to about 960 kg/m$^3$ (40 to 60 lb/ft$^3$). A fluidizing conduit 74 delivers fluidizing gas, typically air, to the dense catalyst bed 59 through a fluidizing distributor 76. In a combustor-style regenerator, approximately no more than 2% of the total gas requirements within the process enter the dense catalyst bed 59 through the fluidizing distributor 76. In this embodiment, gas is added here not for combustion purposes but only for fluidizing purposes, so the catalyst will fluidly exit through the catalyst conduits 67 and 12. The fluidizing gas added through the fluidizing distributor 76 may be combustion gas. In the case where partial combustion is effected in the lower chamber 54, greater amounts of combustion gas will be fed to the upper chamber 70 through fluidizing conduit 74.

From about 10 to 30 wt-% of the catalyst discharged from the lower chamber 54 is present in the gases above the outlets 73 from the riser section 60 and enter the cyclones 82, 84. The regenerator vessel 50 may typically require 14 kg of air per kg of coke removed to obtain complete regeneration. When more catalyst is regenerated, greater amounts of feed may be processed in a conventional reactor riser. The regenerator vessel 50 typically has a temperature of about 594 to about 732° C. (1100 to 1350° F.) in the lower chamber 54 and about 649 to about 760° C. (1200 to 1400° F.) in the upper chamber 70. The regenerated catalyst conduit 12 is in downstream communication with the regenerator vessel 50 and communicates with the riser 10. Regenerated catalyst from dense catalyst bed 59 is transported through regenerated catalyst conduit 12 as a first stream of catalyst from the regenerator vessel 50 back to the reactor riser 10 through the control valve 14 where it again contacts feed as the FCC process continues. Carbonized catalyst in the optional second catalyst conduit 52 comprises a second stream of catalyst.

In an embodiment shown in FIG. 1 which utilizes two catalyst conduits and two catalyst streams, the first regenerated catalyst conduit 12 and the second carbonized catalyst conduit 52 connect to and are in communication with the riser 10. The first stream of regenerated catalyst in the first regenerated catalyst conduit 12 and the second stream of carbonized catalyst in the second carbonized catalyst conduit 52 are fed to the riser 10 and mixed together. One or both of the first regenerated catalyst conduit 12 and the second carbonized catalyst conduit 52 may tangentially connect to the lower section 11 of the riser 10 tangentially to impart an angular motion to catalyst discharged into the riser to promote mixing therein. Additionally, ramps may be installed at the connection between one or both of the first regenerated catalyst conduit 12 and the second carbonized catalyst conduit 52 and the lower section 11 of the riser 10 also to promote mixing in the lower section 11.

The riser may include an insert 92. In an aspect, the lower section 11 of the riser 10 may include the insert 92. In an aspect, the insert 92 is contained in the lower section 11 of the riser. The insert 92 may have an outer wall 94 that may be spaced apart from an inner surface of the wall 90 of the lower section 11 of the riser 10. In an aspect, the insert 92 is radially centered in the lower section 11 of the riser 10. In other words, although not shown, the insert 92 has a central longitudinal axis aligned with a central longitudinal axis of the riser 10. In a further aspect, the outer wall 94 of the insert is a vertical wall. The inner diameter $D_I$ of the insert 92 may be between 0.6 and 1.5 and preferably between 0.8 and 1.2 times the inner diameter $D_C$ of the largest one of the first regenerated catalyst conduit 12 and the second carbonized catalyst conduit 52.

The wall 94 of the insert 92 and the wall 90 of the riser define a space 96 therebetween. In an aspect, insert 92 and the lower section 11 may each be tubular so that together they define an annular space 96 or annulus between the wall 94 of the insert 92 and the wall 90 of the lower section 11. The first regenerated catalyst conduit 12 and the second carbonized catalyst conduit 52 may communicate with the space 96, so the first regenerated catalyst conduit 12 feeds the first stream of regenerated catalyst to the space 96 and the second carbonized catalyst conduit 52 feeds the second stream of carbonized catalyst to the space 96. The catalyst in the space 96 is fluidized by fluidizing gas, such as steam, from fluidizing distributor 19. The first stream of regenerated catalyst from the first catalyst inlet 15 passes around the insert 92 to mix with the second stream of carbonized catalyst from the second catalyst inlet 97 and the second stream of catalyst from the second catalyst inlet 97 passes around the insert 92 to mix with the first stream of catalyst from the first catalyst inlet 15. The mixed stream of the first stream of catalyst and the second stream of catalyst then pass up the riser.

In an aspect, the wall 94 of the insert 92 may be impermeable to catalyst, so it prevents catalyst from passing into the insert. The insert 92 has a closed top which may comprise a hemispherical head which may also be impermeable to catalyst, so it prevents catalyst from entering into the top of the insert 92. Accordingly, the entire insert 92 may be impermeable to catalyst, so no catalyst enters into the insert 92.

The insert may be located in a lower section 11 of the riser 10. The upper section 17 of the riser 10 may be above the insert 92. In an aspect, the frustoconical transition section 13 of the riser which may be between an enlarged section 11 and a narrowed upper section 17 to transition the larger diameter of the enlarged lower section 11 to the narrowed upper section 17 may transition a mixed stream of the first stream of regenerated catalyst and the second stream of carbonized catalyst from the enlarged lower section to the narrowed upper section as the mixed stream of catalyst is passed up the riser. In an aspect, the insert 92 does not extend into the transition section 13, so the transitioning occurs after the mixed stream of catalyst is passed above the insert 92.

The insert 92 may comprise a plenum 98 to which hydrocarbon feed is supplied. In an aspect, the hydrocarbon feed is a vaporous hydrocarbon feed. In an aspect, the hydrocarbon feed supplied to the plenum 98 may be the only hydrocarbon feed fed to the riser 10 or it may be a secondary feed fed in addition to a primary feed fed to the riser. The plenum 98 may be located in a radial center of the riser in the insert 92. The insert 92 may be hollow and the plenum 98 may occupy all or a portion of an interior cavity defined by the outer wall 94 and top of the insert. A nozzle 102 in the plenum may inject hydrocarbon feed from the plenum 98 into the riser. In an aspect, the nozzle 102 may inject hydrocarbon feed into the space 96 between the insert 92 and the wall 90 of the riser 10. In a further aspect, the nozzle 102 injects the hydrocarbon feed stream from the 98 plenum away from a radial center of the riser into the riser. In a further aspect, a plurality of nozzles 102 in the plenum arrayed around the perimeter of the plenum all inject hydrocarbon feed from the plenum 98 into the riser. In a further aspect the hydrocarbon feed injected from the nozzles 102 is in gaseous phase while it is in the plenum 98 before being sprayed into the riser 98. The mixed stream of catalyst contacts the injected hydrocarbon feed stream and the mixed stream of catalyst and hydrocarbon feed pass up the riser. In an aspect, the lowest nozzle 102 is about 1 to about 3 riser inner diameters $D_r$ above a top of the highest catalyst inlet 15.

In an aspect, primary feed distributors 18 may be disposed in the upper section 17 of the riser 10 above the lower section 11, the transition section 13 and the insert 92. Consequently, the primary feed may be injected into the ascending mixed stream of catalyst and hydrocarbon feed.

It is anticipated that the insert 92 be made of stainless steel such as 300 Series stainless steel and be lined with refractory. Additionally, the insert 92 may be made of or coated with a ceramic or other material that resists erosion.

Figure 2:
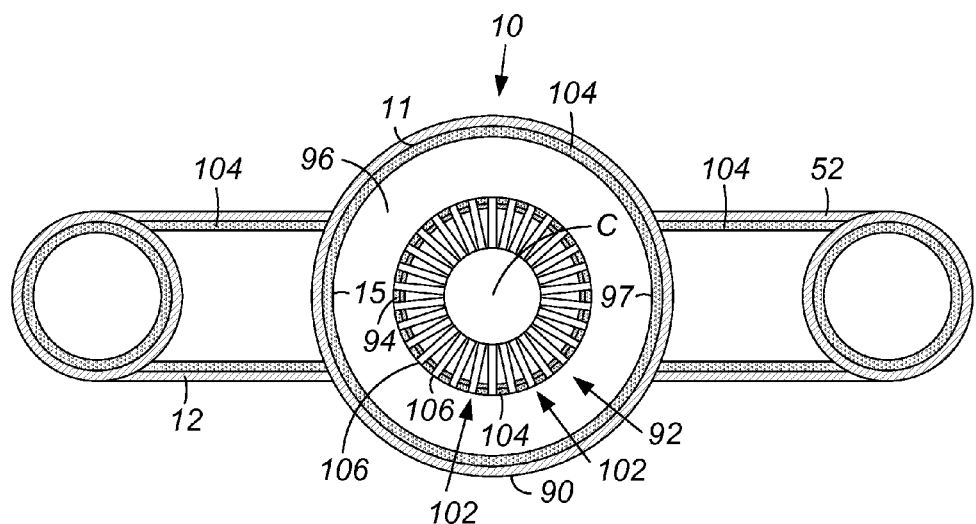
FIG. 2 is a sectional view of FIG. 1 taken at segment 2-2.

FIG. 2 shows a plan sectional view of segment 2-2 taken in FIG. 1. Refractory lining 104 on the wall 94 of the insert 92 and the walls of the lower section 11 of the riser 10, the first regenerated catalyst conduit 12 and the second carbonized catalyst conduit 52 are shown in FIG. 2, but not in FIG. 1. The insert 92 may be located in the lower section 11 of the riser 10. The first catalyst conduit 12 is connected to the riser 10 at a first catalyst inlet 15 and the second catalyst conduit 52 is connected to the riser 10 at a second catalyst inlet 97, and the insert 92 is interposed between the first catalyst inlet and the second catalyst inlet. In an aspect, the first catalyst conduit 12 may be connected to the riser 10 at a first catalyst inlet 15 located in the section 11 of the riser 10, the second catalyst conduit 52 may be connected to the riser 10 at a second catalyst inlet 97 located in the lower section 11 of the riser 10. The first stream of catalyst and the second stream of catalyst may be fed to the space 96 between the wall 90 of the riser and the wall 94 of the insert 92.

The first stream of regenerated catalyst is passed from the first regenerated catalyst inlet 15 around the wall 94 of the insert 92 in the riser 10 to mix with the second stream of carbonized catalyst from the second carbonized catalyst inlet 97, and the second stream of carbonized catalyst is passed from the second carbonized catalyst inlet 97 around the wall 94 of the insert 92 in the riser 10 to mix with the first stream of regenerated catalyst from the first regenerated catalyst inlet 15. The first stream of catalyst and the second stream of catalyst may pass around the annular space 96 in the riser 10 to mix with each other. The mixed stream of the first stream of regenerated catalyst and the second stream of carbonized catalyst may pass around the insert 92 and up the riser 10.

The nozzles 102 may have an outlet ends 106 directed away from said radial center C of the riser for injecting hydrocarbon feed into the riser to contact the mixed stream of catalyst rising from the catalyst inlets 15 and 97 propelled by fluidizing gas from distributor 19 (FIG. 1, not shown in FIG. 2 for simplicity). Nozzles 102 may be disposed at a higher elevation than the first catalyst inlet 15 and the second catalyst inlet 97, so the feed is injected into a thoroughly mixed stream of the first catalyst stream and the second catalyst stream.

Figure 3:
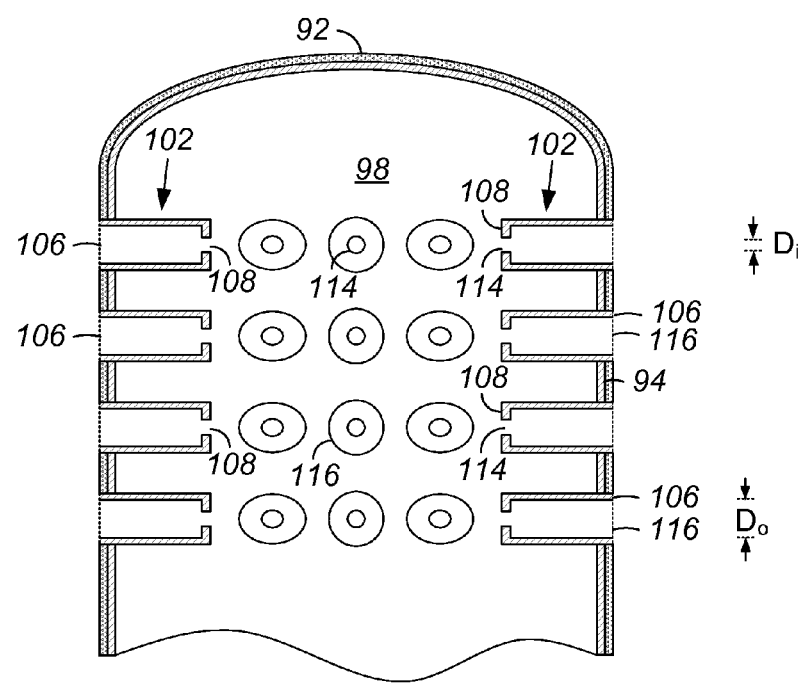
FIG. 3 is an enlarged, partial elevational view of a portion of FIG. 1.

FIG. 3 is an enlarged, partial elevational view of the top of the insert 92 and plenum 98 of FIG. 1. The profile of the nozzles 102 are shown for illustrative purposes in FIG. 3. Each nozzle 102 has an inlet end 108 in the plenum 98 and an outlet end 106 at the outlet wall 94 of the insert 92. The hydrocarbon feed is injected from a plurality of nozzles 102 with an inlet end 108 inside of the plenum 98. The inlet end 108 has an opening 114 therein having an inner diameter $D_i$. The outlet end 106 has an opening 116, shown in dashed lines, therein having an inner diameter $D_o$. The hydrocarbon stream is distributed through numerous dual diameter nozzles 102 located in the riser. The dual diameter nozzle 102 provides a means to independently set the jet outlet velocity and the distributor pressure drop of vaporous hydrocarbon feed. The jet outlet velocity is adjusted by the number and area of the openings 116 in the outlet ends 106 of the nozzles 102 while the pressure drop is set by the number and area of the openings 114 in the inlet end 108 in the plenum 98. The nozzles 102 typically will have inner diameters $D_i$ in the opening 114 in the inlet end 108 that are smaller than the inner diameters $D_o$ of the opening 116 in the outlet end 106 of the nozzle 102.

Figure 4:
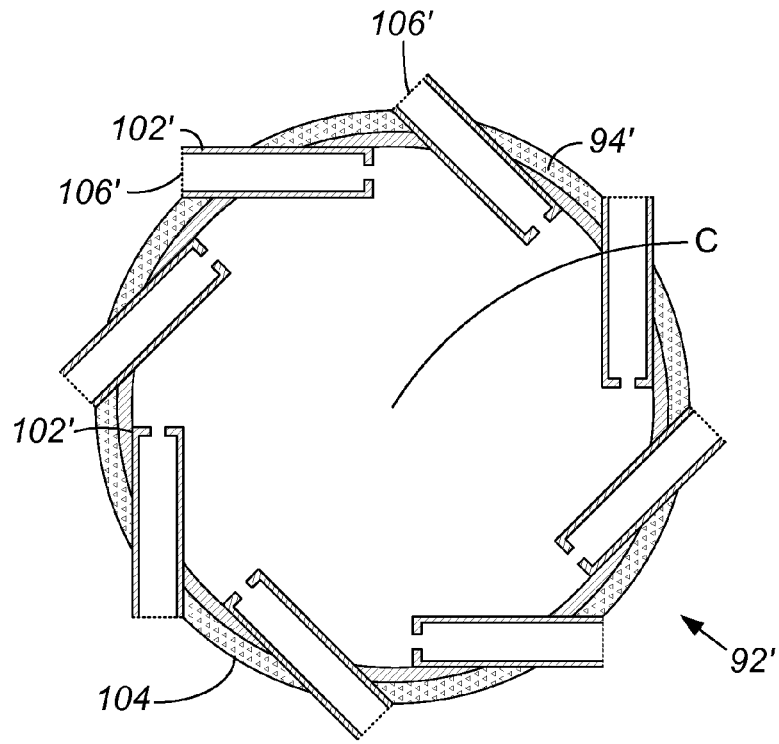
FIG. 4 is a partial, sectional view which is an alternative to FIG. 2.

FIG. 4 shows an alternative enlarged partial plan view of FIG. 2. Elements in FIG. 4 with the same configuration as in FIG. 2 will have the same reference numeral as in FIG. 2. Elements in FIG. 4 which have a different configuration as the corresponding element in FIG. 2 will have the same reference numeral but be succeeded with a prime symbol ('). The apparatus and process in FIG. 4 is the same as in FIG. 2 with the exception of the noted following differences. In FIG. 4, the nozzles 102' are disposed tangentially with respect to a outer wall of the plenum 98' which is the outer wall 94' of the insert 92'. The outer wall 94' to which the nozzles 102' are tangential may be a vertical wall. The nozzles 102' have the same configuration as in FIG. 2, but are oriented tangentially to promote feed and catalyst mixing. The nozzles 102' inject hydrocarbon feed tangentially from the plenum 98'. The outlet ends 106' of the nozzles are directed away from a radial center of said riser. The outer wall 94' of the insert 92' may be coated with refractory 104, so the tangentialness of the nozzles 102' may be related to the coating of refractory 104.

Figure 5:
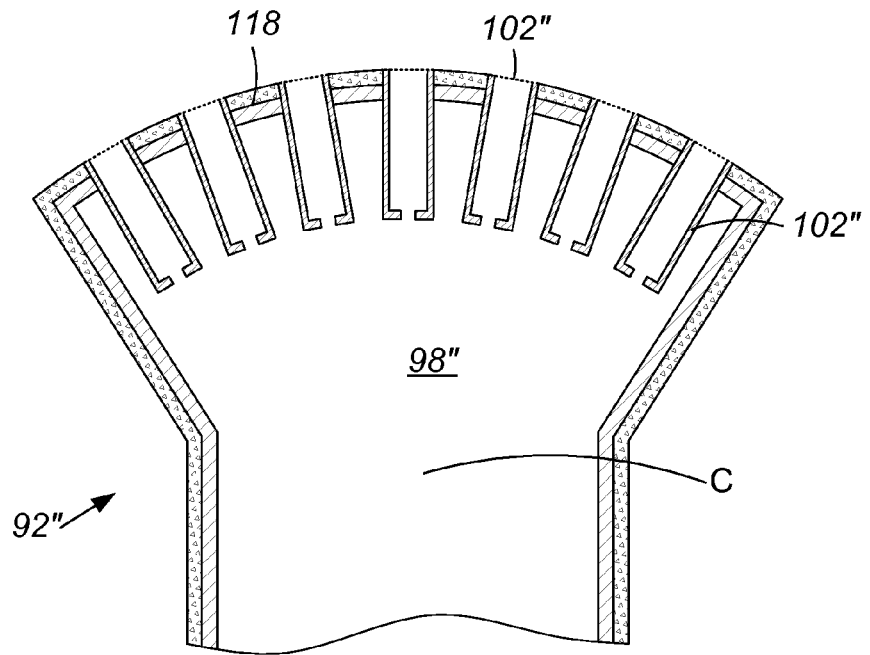
FIG. 5 is an enlarged, partial elevational view of an alternative embodiment to FIG. 3.

FIG. 5 shows an alternative view of FIG. 3. Elements in FIG. 5 with the same configuration as in FIG. 3 will have the same reference numeral as in FIG. 3. Elements in FIG. 5 which have a different configuration as the corresponding element in FIG. 3 will have the same reference numeral but be succeeded with a double prime symbol ("). The apparatus and process in FIG. 5 is the same as in FIG. 3 with the exception of the noted following differences. In FIG. 5, the insert 92" has a dished top 118 with nozzles 102" directed radially upwardly from the plenum 98" through the dished top 118. The nozzles 102" inject the hydrocarbon feed upwardly from said plenum 98". The nozzles 102" may have the same configuration as in FIG. 3, but are oriented radially to promote feed and catalyst mixing and upward fluidization. The nozzles 102" inject the hydrocarbon feed stream through a top of the plenum 98".

Figure 6:
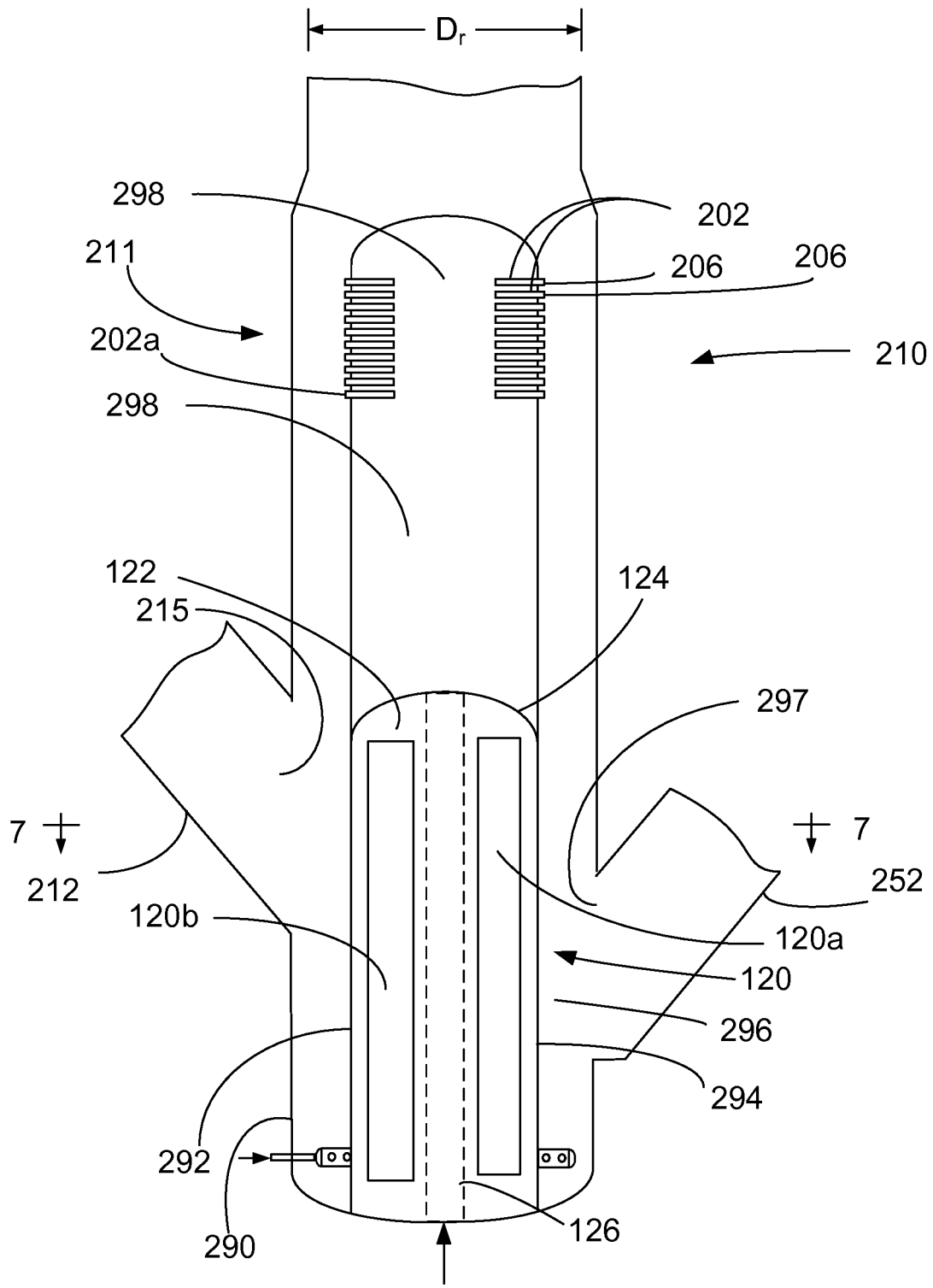
FIG. 6 is a partial, elevation view of an alternative to FIG. 1

FIG. 6 is an enlarged sectional view of an alternative embodiment to FIG. 1 of a lower section 211 of a riser 210. Elements in FIG. 6 with the same configuration as in FIG. 1 will have the same reference numeral as in FIG. 1. Elements in FIG. 6 which have a different configuration as the corresponding element in FIG. 1 will have the same reference numeral but be preceded with a numeral "2". The apparatus and process in FIG. 6 is the same as in FIG. 1 with the exception of the noted following differences.

In FIG. 6, an insert 292 includes at least one opening 120 to a chamber 122 inside the insert. A plenum 298 is disposed in the insert 292. In an aspect, the plenum 298 is disposed in a top of the insert 292. A baffle 124 isolates the chamber 122 from the plenum 298 in the interior of the insert 292. A conduit 126 extends from outside of the riser 210 through the chamber 122 to the plenum 298 for passing hydrocarbon feed to the plenum. The conduit 126 may extend through a bottom of the riser 210. At least one nozzle 202, and in an aspect, a plurality of nozzles 202, injects hydrocarbon feed from the plenum 298 into the riser 210. Outlet ends 206 of the nozzles 202 are disposed in the riser 210. In an aspect, the nozzles 202 inject hydrocarbon feed into a lower section 211 of the riser 210.

The chamber 122 may include at least one opening 120 in the wall 294 located in a space 296 between the wall 294 of the insert 292 and a wall 290 of the riser 210. The opening 120 may be spaced apart from the wall 290 of the riser 210. The opening 120 may serve as an entrance to an interior of the chamber 122. The chamber 122 may be in communication with the first regenerated catalyst conduit 212 and the second carbonized catalyst conduit 252, so at least a portion of the first stream of regenerated catalyst and at least a portion of the second stream of carbonized catalyst may pass from the space 296 into the chamber 122 through the opening 120 in the chamber. In an aspect, an upper most portion of the opening 120 may be at an elevation above a lower most portion, and preferably an upper most portion, of a second catalyst inlet 297. In a further aspect, an upper most portion of the opening 120 may be at an elevation above a lower most, and preferably an upper most portion, of a first catalyst inlet 215. Hence, the first stream of regenerated catalyst may pass from the inlet 215 of the first catalyst conduit 212, and the second stream of carbonized catalyst may pass from the inlet 297 of the second catalyst conduit 252 may pass at least partially upwardly through the opening 120 into the chamber 122 through the space 296 between the wall 290 of the riser 210 and the wall 294 of the insert 292. One or a plurality of openings 120a and 120b may be provided in the wall 294. At least one opening 120 may have an elongated configuration that is spaced from the top of the insert 292.

Figure 7:
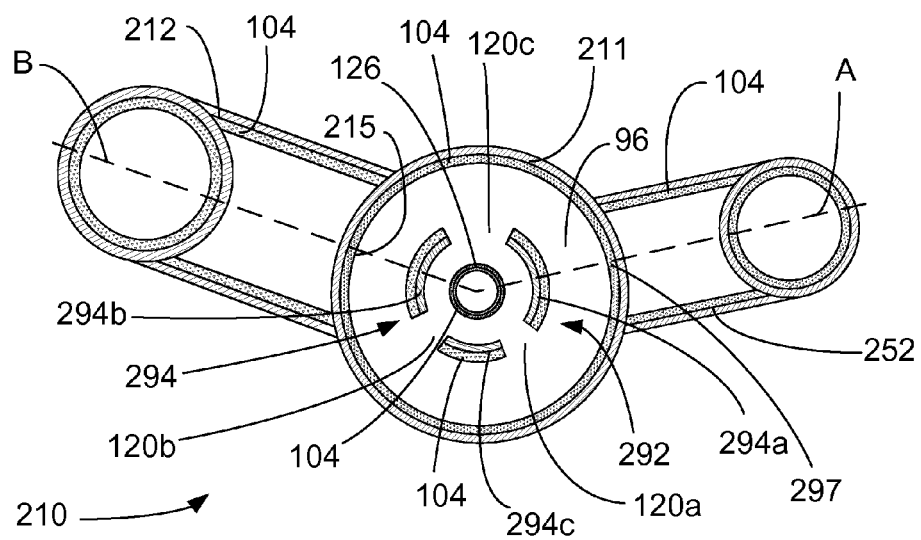
FIG. 7 is a sectional view taken at segment 7-7 of FIG. 6.

FIG. 7 shows a plan sectional view of segment 7-7 taken in FIG. 6. Refractory lining 104 on the wall 294 of the insert 292 and the wall of the lower section 211 of the riser 210, the conduit 126, the first regenerated catalyst conduit 212 and the second carbonized catalyst conduit 252 is shown in FIG. 7. The first regenerated catalyst conduit 212 and the second carbonized catalyst conduit 252 define a 150 degree angle instead of a 180 degree angle as in FIG. 2. The wall 294 of the insert 292 comprises three arcuate sections 294a-c that define three openings 120a-c. Two openings 120a and 120b may have a smaller width than a third opening 120c. In an aspect, the two smaller openings 120a and 120b have the same arcuate width. Arcuate section 294a opposes the nearest catalyst conduit which may be the second carbonized catalyst conduit 252 and particularly the second catalyst inlet 297 thereof. Arcuate section 294b also opposes the nearest catalyst conduit which may be the first regenerated catalyst conduit 212 and particularly the first catalyst inlet 215 thereof. The third arcuate section 294c is optional. Dashed lines show central longitudinal axis A of the first regenerated catalyst conduit into the riser 10 and central longitudinal axis B of the second carbonized catalyst conduit 252 into the riser. The openings 120 are all not intersected by a longitudinal axis A, B of a nearest one of the first regenerated catalyst conduit 212 and the second carbonized catalyst conduit 252 into the riser. In other words, the first catalyst inlet 215 and the second catalyst inlet 297 are azimuthal to openings 120a-c. Arcuate sections 294a and 294b may be narrower or wider than the closest catalyst inlet 215, 297. Conduit 126 is protected from direct impact by catalyst streams by arcuate sections 294a and 294b of wall 294. The conduit 126 may be coated in refractory 104 for protection.

The first stream of regenerated catalyst is passed from the first regenerated catalyst inlet 215 around the arcuate section 294b of the wall 294 of the insert 292 in the riser 210 to mix with the second stream of carbonized catalyst from the second carbonized catalyst inlet 297, and the second stream of carbonized catalyst is passed from the second carbonized catalyst inlet 297 around the arcuate section 294a of the wall 294 of the insert 292 in the riser 210 to mix with the first stream of regenerated catalyst from the first regenerated catalyst inlet 215. Additionally, the first stream of catalyst may pass through openings 120 into the chamber 122 in the insert 292 to mix with the second stream of catalyst and the second stream of catalyst may pass through openings 120 into the chamber 122 to mix with first stream of catalyst.

In an aspect, the at least one opening 120 in the wall 294 of the insert 292 may serve as an exit from the chamber 122. Consequently, the first stream of regenerated catalyst and the second stream of carbonized catalyst may pass through the opening 120 from the chamber 122 back into the space 296. By virtue of the first and second catalyst streams passing around the insert 292 and entering into and exiting from the chamber 122 through the at least one opening 120 in the wall 294 of the insert 292, the catalyst streams mix together to provide a mixed stream of catalyst with a more-homogeneous temperature throughout the mixed stream of catalyst.

Turning back to FIG. 6, the mixed stream of the first stream of catalyst and the second stream of catalyst passes from the insert 292 in the riser 210 upwardly from the lower section 211 and is contacted with the hydrocarbon feed injected from nozzles 202 in the plenum 298 located above the opening 120 in the riser 210. In an aspect, the lowest nozzle 202a is about 1 to about 3 riser inner diameters $D_r$ above a top of the highest catalyst inlet 215. In an aspect, the hydrocarbon feed in the plenum 298 is vaporous.

Figure 8:
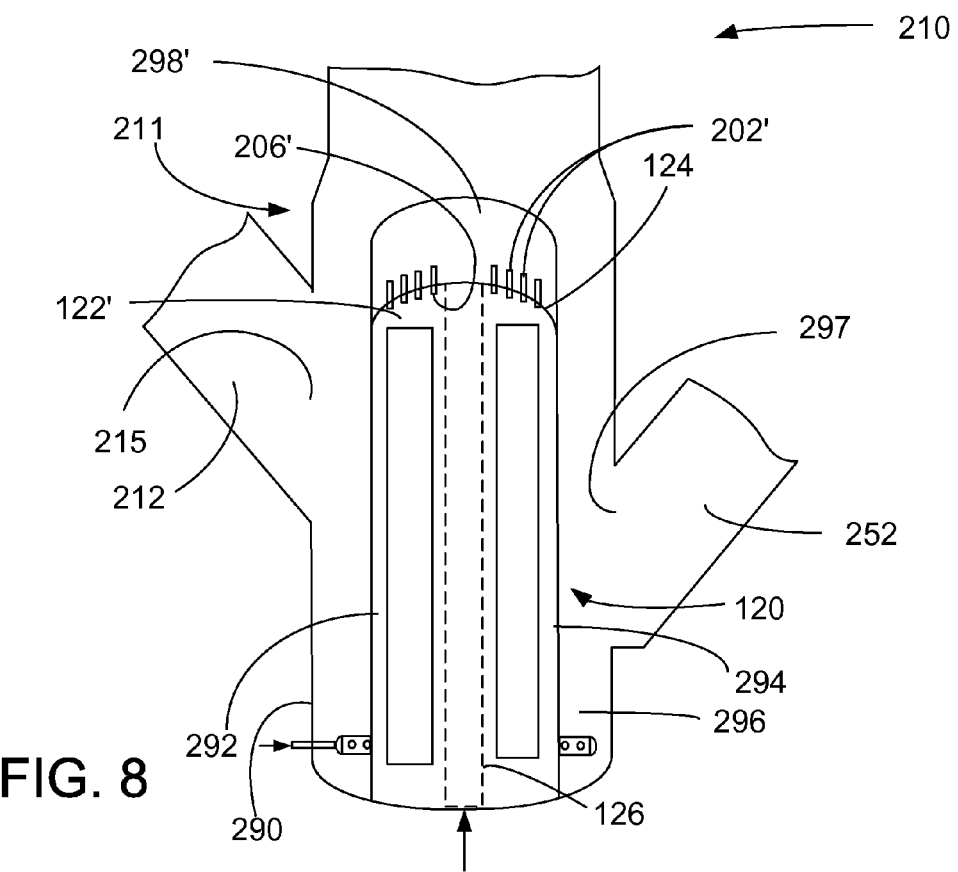
FIG. 8 shows an alternative partial, elevational view to FIG. 6.

FIG. 8 shows an alternative elevational partial view of FIG. 6. Elements in FIG. 8 with the same configuration as in FIG. 6 will have the same reference numeral as in FIG. 6. Elements in FIG. 8 which have a different configuration as the corresponding element in FIG. 6 will have the same reference numeral but be succeeded with a prime symbol ('). The apparatus and process in FIG. 8 is the same as in FIG. 6 with the exception of the noted following differences. In FIG. 8, outlet ends 206' of the nozzles 202' are disposed in the chamber 122'. The nozzles 202' are disposed in the plenum 298' to project hydrocarbon feed into the chamber 122'. FIG. 8 shows the nozzles 202' projecting feed downwardly, but other arrangements or orientations may be suitable. The nozzles 202' may have the same configuration as in FIG. 2 but with a different orientation as shown in FIG. 8. The nozzles 202' inject hydrocarbon feed from the plenum 298' to contact with the first stream of catalyst and the second stream of catalyst in the chamber 122'.

Preferred embodiments of this invention are described herein, including the best mode known to the inventors for carrying out the invention. It should be understood that the illustrated embodiments are exemplary only, and should not be taken as limiting the scope of the invention.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing, all temperatures are set forth in degrees Celsius and, all parts and percentages are by weight, unless otherwise indicated. Pressures are given at the vessel outlet and particularly at the vapor outlet in vessels with multiple outlets.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. An apparatus for fluid catalysis comprising:
   a riser;
   a plenum located in an radial center of said riser; and
   a nozzle in said plenum with an outlet end directed away from said radial center for injecting hydrocarbon feed, wherein said nozzle is disposed tangentially with respect to an outer wall of said plenum.

2. The apparatus of claim 1 further comprising an insert having an outer wall spaced from a wall of said riser and said plenum is located in said insert.

3. The apparatus of claim 2 wherein said insert includes an opening to a chamber inside said insert.

4. The apparatus of claim 1 further comprising:
   a first catalyst inlet in communication with the riser;
   a second catalyst inlet in communication with the riser; and
   an insert in said riser between said first catalyst inlet and said second catalyst inlet.

5. The apparatus of claim 4 wherein a first catalyst conduit is connected to said riser at said first catalyst inlet and a second catalyst conduit is connected to said riser at said second catalyst inlet and the insert is interposed between said first catalyst inlet and said second catalyst inlet.

6. The apparatus of claim 4 wherein said insert has dished top with nozzles in the top.

7. The apparatus of claim 5 further including a transition section of the riser between an enlarged section and a narrowed section and the insert does not extend into the transition section.

8. The apparatus of claim 5 wherein said nozzle is disposed at a higher elevation than said first catalyst inlet and said second catalyst inlet.

9. The apparatus of claim 1 further including a conduit to said plenum for passing hydrocarbon feed to said plenum.

10. The apparatus of claim 1 wherein said nozzle has an inlet with a smaller inner diameter than an outlet of said nozzle.

11. The apparatus of claim 10 wherein said nozzle is disposed radially with respect to an upper end of said plenum.

12. An apparatus for fluid catalysis comprising:
    a riser;
    an insert in said riser defining a space between a wall of said riser and a wall of said insert, an opening to a chamber inside said insert;
    a nozzle in said insert for injecting hydrocarbon feed, an outlet end of said nozzle being disposed in said chamber;
    a first catalyst inlet in communication with the riser;
    a second catalyst inlet in communication with the riser; and
    said insert in said riser between said first catalyst inlet and said second catalyst inlet.

13. The apparatus of claim 12 wherein an outlet end of said nozzle is directed away from a radial center of said riser.

14. The apparatus of claim 12 wherein said insert has a dished top with nozzles in the top.

15. The apparatus of claim 12 wherein said nozzle is disposed at a higher elevation than said first catalyst inlet and said second catalyst inlet.

16. An apparatus for fluid catalysis comprising:
    a riser;
    an insert in said riser defining a space between a wall of said riser and a wall of said insert, said insert having a dished top with nozzles in the top for injecting hydrocarbon feed;
    a first catalyst inlet in communication with the riser;
    a second catalyst inlet in communication with the riser; and
    said insert in said riser is between said first catalyst inlet and said second catalyst inlet and said nozzle is disposed at a higher elevation than said first catalyst inlet and said second catalyst inlet.

17. The apparatus of claim 16 wherein a plenum is located in said insert and said nozzle is in communication with said plenum.

* * * * *